United States Patent [19]

Clapp

[11] 4,341,426
[45] Jul. 27, 1982

[54] CLAMP-UP DEVICE FOR ROLL NECK BEARINGS

[75] Inventor: James R. Clapp, Canton, Ohio

[73] Assignee: The Timken Company, Canton, Ohio

[21] Appl. No.: 199,485

[22] Filed: Oct. 22, 1980

[51] Int. Cl.³ .............................................. F16C 43/04
[52] U.S. Cl. ............................. 308/187.1; 308/207 R; 308/236
[58] Field of Search ............... 308/187.1, 236, 207 R, 308/207 A, DIG. 11, 216, 9

[56] References Cited

U.S. PATENT DOCUMENTS

| | | | |
|---|---|---|---|
| 3,304,139 | 2/1967 | Toth et al. | 308/207 R |
| 3,733,108 | 5/1973 | Petros et al. | 308/236 |
| 3,799,636 | 3/1974 | Kersting | 308/207 R |
| 3,966,282 | 6/1976 | Overton | 308/207 R |

*Primary Examiner*—Lenard A. Footland
*Attorney, Agent, or Firm*—Gravely, Lieder & Woodruff

[57] ABSTRACT

A bearing for a mill roll is forced to and held in the proper position on the neck of the roll by a clamp-up device that fits around the roll neck between the bearing and a conventional splint hinged ring which serves as a backing for the device. The clamp-up device includes inner and outer rings which together form an annular fluid chamber, and when this chamber is pressurized, the outer ring extends, forcing the bearing to its proper position on the roll neck. Within the chamber, each ring is provided with ramps which align and come against each other when the outer ring is turned to the proper angular relationship with respect to the inner ring, and when the outer ring is so disposed it will remain axially extended to hold the bearing in its proper position on the roll neck during operation of the mill roll. A locking plate is provided to lock the rings against rotation relative to each other once they are in the proper angular relation. The clamp-up device is particularly useful in connection with bearings designed to fit tightly over tapered roll necks.

12 Claims, 5 Drawing Figures

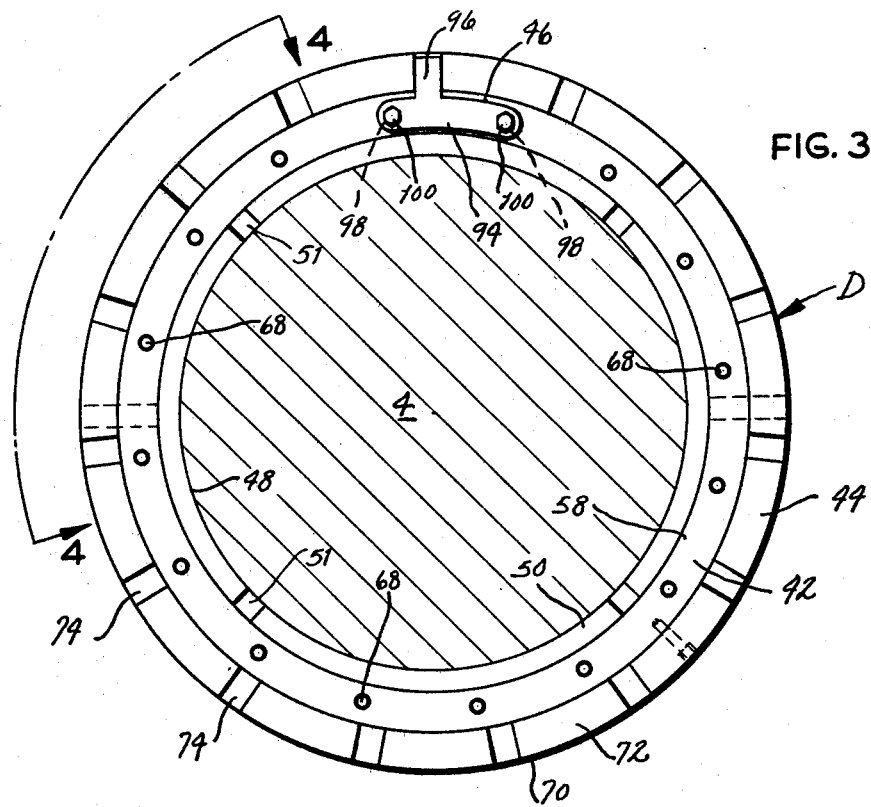
FIG. 3
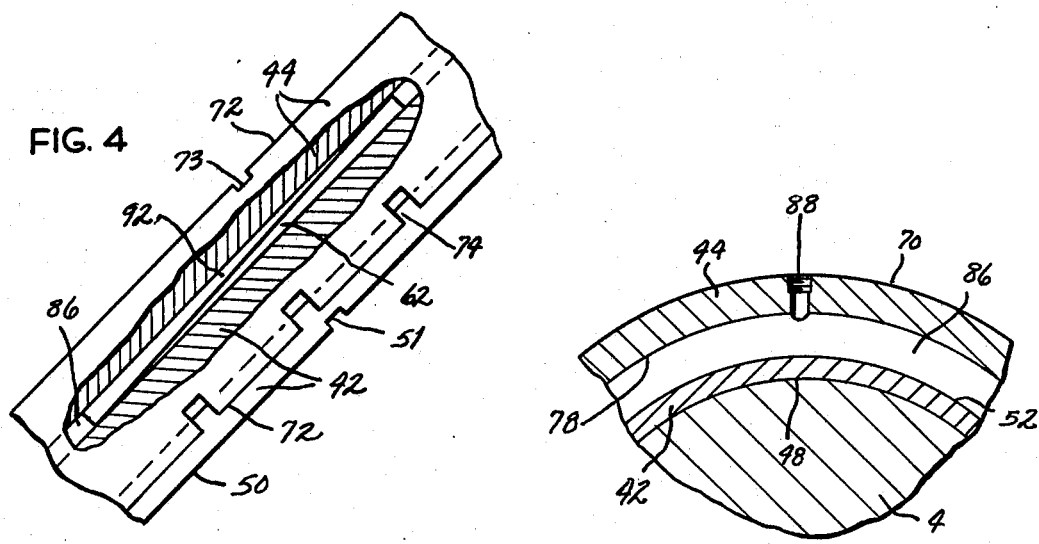
FIG. 4
FIG. 5

CLAMP-UP DEVICE FOR ROLL NECK BEARINGS

BACKGROUND OF THE INVENTION

This invention relates in general to bearings and more particularly to a clamp-up device for properly positioning such bearings on shafts such as the necks of mill rolls.

The bearings used in rolling mill stands must not only be capable of supporting the mill rolls, but must also resist the tremendous forces applied to such rolls with sufficient rigidity to enable metal shapes to be rolled to within close tolerances. Where high rolling speeds are employed, it is desirable to have the inner race of each bearing fitted tightly to its roll neck to eliminate neck scuffing and wear. Similarly, tight fits improve the stability of the roll mounting and are frequently required where the rolling must be performed with considerable percision.

While any bearing can be tightly fitted to a shaft or roll neck, merely by creating an interference fit, the better procedure is to taper the roll neck at each of the roll ends and use on that roll neck a bearing having the bore of its inner race, or cone bore in the case of a tapered roller bearing, tapered to conform to the taper of the roll neck. These bearings, in comparison with loosely fitted bearings, are somewhat more difficult to install on and to withdraw from their tapered roll necks because of the tight fits that are involved. Indeed, various hydraulic appliances are required for both installation and removal.

With regard to installation, the bearing is manipulated over the roll neck until the cone fits loosely on the tapered portion of the neck. Then a hydraulic ring jack is placed over the roll neck adjacent to the outer end of the bearing, and a split hinged ring is fitted into a groove within the roll neck to serve as a backing for the ring jack. Once the ring jack is in place, lines from a hydraulic pump are connected to it and it is pressurized so that it expands axially and forces the inner race of the bearing up the taper of the roll neck until the inner race is tightly seated. The jack is then removed and replaced with a clamping nut and a ring over which the nut threads. This requires removal of the split hinged ring followed by removal of the jack. The nut and threaded ring, in a contracted condition, are then passed over the roll neck to the place formerly occupied by the jack, and the split hinged ring is replaced. Finally the nut is tightened, usually with a spanner wrench, to hold the bearing fast.

To remove the bearing, the nut must be loosened, and usually this requires a special hydraulic wrench which is installed over the roll neck and nut, since after a short period of mill operation the nut is usually so tight that it cannot be loosened with a manually manipulated wrench. Once the split hinged ring and nut are removed, the inner race is usually expanded slightly by forcing pressurized hydraulic fluid through drilled holes and into annular grooves, the latter of which open out of the roll neck and toward the surface of the tapered cone bore. This breaks the grip of the cone on the tapered roll neck.

Both the installation and removal of a tightly fitted roll neck bearing from a tapered roll neck are burdensome and time consuming procedures. Inasmuch as the rolls of rolling mills receive a considerable amount of abuse, they must be replaced often. Under these circumstances, it is desirable to make the replacement as easy and as quick as possible.

SUMMARY OF THE INVENTION

One of the principal objects of the invention is to provide a clamp-up device for facilitating the installation and securement of bearings where the bearings must be removed at relatively frequent intervals. Another object is to provide a clamp-up device of the type stated that is useful with bearings for mill rolls. A further object is to provide a clamp-up device of the type stated which greatly reduces the time and effort required to install roll neck bearings and place mill rolls in operation. An additional object is to provide a clamp-up device that is capable of being substituted for conventional clamp-up and securement devices without any modification of the mill rolls. Still another object is to provide a clamp-up device of the type stated that is particularly useful in installing bearings on tapered roll necks. These and other objects and advantages will become apparent hereinafter.

The present invention is embodied in a clamp-up device including first and second members which together define a fluid chamber arranged to cause the one member to move axially with respect to the other when the chamber is pressurized. At least one of the members is provided with a ramp which, when the members are brought into the proper angular relation, holds the clamp-up device in an expanded condition. The invention also resides in the combination of a mill roll, a bearing, a backing member, and a clamp-up device positioned between the bearing and the backing member. The clamp-up device includes two rings, pressure operated means for moving one ring axially with respect to the other, and a ramp on at least one of the rings for engaging the other ring to hold the rings in the axially extended position to which they are moved by the pressure operated means. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 3 is an end elevational view of the clamp-up device taken along line 3—3 of FIG. 2;

FIG. 4 is a side view, partially broken away and in section, of the clamp-up device taken along line 4—4 of FIG. 3; and FIG. 5 is a fragmentary sectional view of the clamp-up device taken along line 5—5 of FIG. 2.

DETAILED DESCRIPTION

Figure 1:
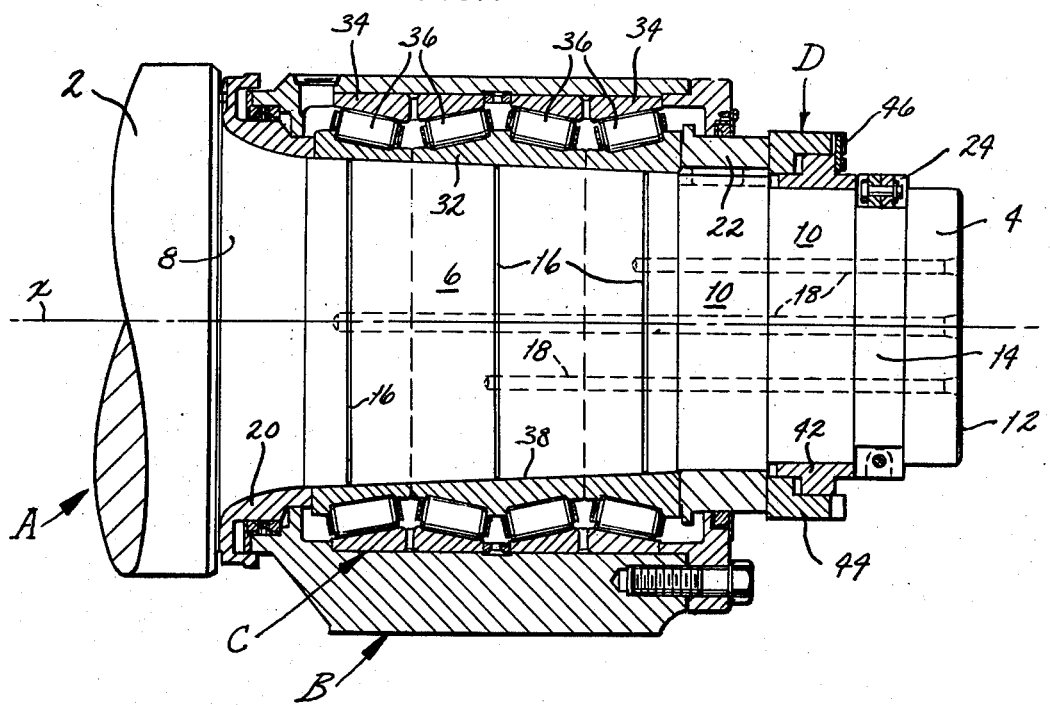
FIG. 1 is a sectional view of a roll neck bearing which is held on the roll neck of a mill roll by a clamp-up device constructed in accordance with and embodying the present invention.

Referring now to the drawings, a mill roll A (FIG. 1) is supported in a chock B by a multirow bearing C which enables the roll A to revolve easily and with considerable stability about its axis X. The mill roll A forms part of a roll stand and as such is used in working various metal shapes to reduce the thickness of the shapes and improve their metallurgical properties. It may be either a work roll, which actually contacts the metal shape, or a back-up roll which bears against a work roll or against another back-up roll to prevent it from deflecting excessively under the enormous loads that are encountered.

The mill roll A, is conventional and includes (FIG. 1) a barrel 2, usually of cylindrical configuration, and a roll neck 4 extended axially from each end of the roll barrel 2. Each roll neck 4 in turn includes a bearing seat 6 that merges into the roll barrel 2 at a fillet 8. The bearing seat 6 may be cylindrical or it may be tapered downwardly away from the fillet 8, the latter being preferred where tightly fitted bearings are derived. Beyond the bearing seat 6, each roll neck 4 has an extension 10 which terminates at an end face 12, and the extension 10 is composed of several cylindrical surfaces and has a groove 14 located quite near the end face 12. Where the bearing seat 6 is tapered, it is desirable to provide it with several shallow annular channels 16, each of which is connected with a different bore 18 that extends axially into the roll neck 4 from its end face 12.

The bearing C fits around the bearing seat 6 where it is confined between a fillet ring 20 and a cone thrust ring 22, the former being at the fillet 8 as a permanent part of the roll A, while the latter surrounds the roll neck extension 10 beyond the seat 6. The cone thrust ring 22 in turn is maintained in position by a clamp-up device D, which also surrounds the extension 10, and the clamp-up device D is backed by a split hinged ring 24 that fits into the groove 14. Thus, the fillet ring 20, the bearing C, and the cone thrust ring 22, are all held firmly in place on the roll neck 4 by the clamp-up device D, with the split hinged ring 24 serving as a backing for the clamp-up device D.

The split hinged ring 24, which is conventional, has two semicircular segments 26 (FIG. 2) which are joined together by a hinge pin 28 so that the ring 24 can be opened and removed from the groove 14 in the roll neck 4. The free ends of the segments 26, that is the ends remote from the hinge pin 28, are held together by a clamping screw 30 which when turned down, clamps the hinged ring 24 tightly around the roll neck 4.

The bearing C is a conventional roll neck bearing, such as a type TQIT tapered roller bearing sold by The Timken Company. It includes (FIG. 1) an inner race or cone 32 that fits tightly around the bearing seat 6, an outer race or cup 34 that fits within the chock B, and tapered rollers 36 that are arranged in several rows between the cone 32 and the cup 34. Normally, neither the cone 32 nor the cup 34 is a unitary structure, but instead is segmented to facilitate machining and assembly of the bearing C. The end face at the inboard end of the cone 32 bears against the fillet ring 20, while the one at the outboard end bears against the cone thrust ring 22. Extending between the two end faces is the cone bore 38 which is tapered, its taper corresponding to that of the bearing seat 6 and its diameter being such as to insure a tight fit on the bearing seat 6.

The clamp-up device D fits over the extension 10 of the roll neck 4 in the space occupied alternately by the hydraulic jack and the nut and threaded ring in a conventional installation procedure. Not only does the clamp-up device D force the cone 32 of the bearing C tightly onto the bearing seat 6 and against fillet ring 20, all by exerting an axially directed force on the cone 32, but it further maintains the cone 32 in that position while the mill roll A revolves. Therefore, the split hinged ring 24 is installed only once with each change of the bearing C, which is in contrast to conventional procedures. In this regard, it will be recalled that in the conventional installation procedure, the split hinged ring 24 is first installed behind a hydraulic ring jack, then removed to permit removal of the jack, and then reinstalled, this time behind a nut and threaded ring to hold the bearing cone 32 in place as the mill roll A revolves.

The clamp-up device D basically includes (FIG. 2) three components—namely, an inner ring 42 which fits around the roll neck extension 10 between the cone thrust ring 22 and the split hinged ring 24, an outer ring 44 that fits around the inner ring 42 and, when unrestrained, is capable of both rotational and axial movement on the inner ring 42, and a locking plate 46 that prevents the outer ring 44 from rotating relative to the inner ring 42. The inner ring 42 bears against the split hinged ring 24, which serves as a backing for it, while the outer ring 44 bears against the cone thrust ring 22.

The inner ring 42 has a bore 48 (FIG. 2) of constant diameter which extends completely through it from one end to the other, and that diameter is slightly greater than the diameter of the roll neck extension 10 over which the clamp-up device D fits so that the inner ring 42 will slide easily over the roll neck extension 10. At the two ends of the bore 48, the inner ring 42 has end faces 50 which are squared off with respect to the axis X. The outboard or rear end face 50 is located opposite to and normally bears against split hinged ring 24, and opening out of this face are radial slots 51. The inboard or front end face 50 on the other hand, is spaced from the end of the cone thrust ring 22. In contrast to the inwardly presented surface, that is the surface of the bore 48, the outwardly presented surface of the inner ring 42 is stepped, consisting of a cylindrical sealing surface 52 that extends out to the front end face 50, a front wall 54 that is squared off with respect to the axis X, a large diameter outer surface 56, a back shoulder 58 that is also squared off with respect to the axis X, and a cylindrical end surface 60 that extends out of the outboard end face 50, the foregoing surfaces all being arranged in that order between the front and rear end faces 50.

The sealing surface 52 is preferably ground to a cylindrical configuration to enable an elastomeric seal element to form a fluid-tight contact with it. The front wall 54, while for the most part being squared off with respect to the axis X, has several camming or wedging ramps 62 (FIG. 4) which are concentric to the axis X and have their inclined surfaces presented forwardly toward the bearing C. These ramps 62 are spaced at equal angular intervals around the shoulder 54, and all rise in the same direction. Preferably, two or three ramps 62 are along the front wall 54. They may be formed integral with the inner ring 42 or as separate elements that are welded or bolted in place.

Figure 2:
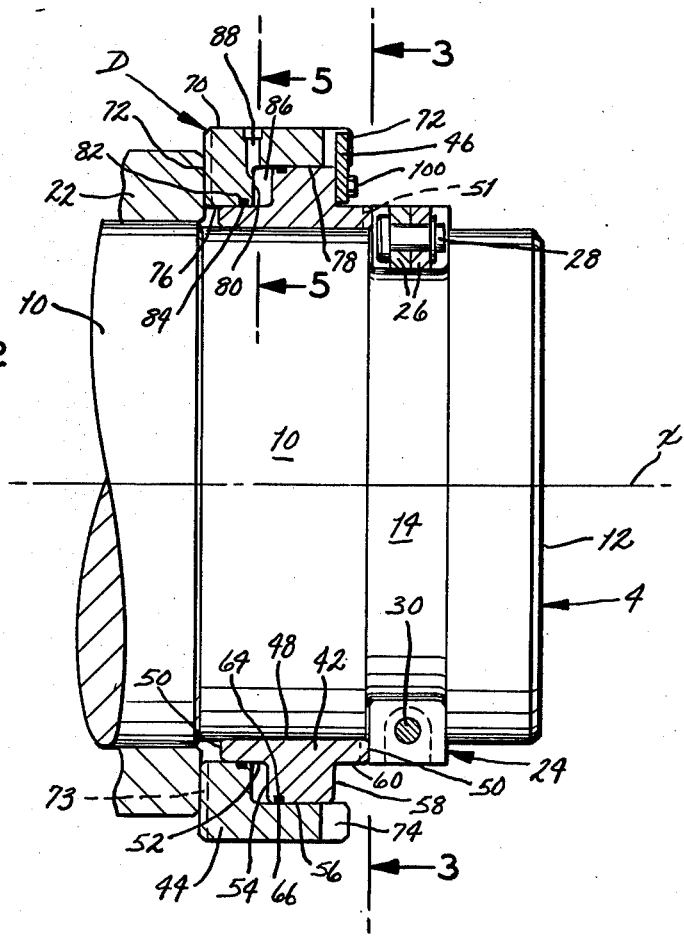
FIG. 2 is an enlarged sectional view of the clamp-up device and the split hinged ring which backs it.

The outer surface 56 of the inner ring 42 is cylindrical in configuration and opening out of it near the front wall 54 is an annular groove 64 that contains an elastomeric seal 66 (FIG. 2). Opening out of the back shoulder 58 are threaded holes 68 (FIG. 3) which are located at equally spaced angular intervals, such as 22.5°, with all of the holes 68 being at the same radius from the axis X. The cylindrical end surface 60 extends between the back shoulder 58 and the rear end face 50 and has about the same diameter as the outside diameter of the split hinged ring 24.

The outer ring 44, which fits around the inner ring 42, has a cylindrical outer surface 70 (FIG. 2) of constant diameter and end faces 72 at the ends of that surface. The end faces 72 are squared off with respect to the axis X, with the front end faces 72 being presented toward and normally abutting the cone thrust ring 22. Opening out of it are radial slots 73. The rear end face 72 is always disposed beyond the back shoulder 58 of the inner ring 42, and opening out of the rear end face are notches 74 (FIGS. 2-4) which are spaced at equal angular intervals and are deep enough to extend forwardly past the back shoulder 58 of the inner ring 42. While the notches 74, like the threaded holes 68 are equally spaced, there are fewer notches 74 than holes 68 so that the angle between each threaded hole 68 and the nearest notch 74 varies around the clamp-up device D.

The inwardly presented surface of the outer ring 44 is stepped to conform generally to the stepped outwardly presented contour of the inner ring 42, at least in the region of the sealing surface 52, front wall 54, and outer surface 56. To this end the outer ring 44 has a cylindrical forward surface 76 (FIG. 2) that extends rearwardly from the front end face 72 and surrounds the sealing surface 52 on the inner ring 42, it being slightly larger in diameter than the sealing surface 52 so that the outer ring 44 can both rotate and move axially with respect to the inner ring 42. In addition, the outer ring 44 has a cylindrical sealing surface 78 which surrounds the cylindrical outer surface 56 on the inner ring 42 and is also slightly larger in diameter than the surface 56, so that it does not prevent the ring 44 from turning or shifting axially. Between the two cylindrical surfaces 76 and 78 is a rear wall 80 that is squared off with respect to the axis X.

The elastomeric seal 66, which projects from the outer surface 56 of the inner ring 42, contacts the rear sealing surface 78 on the outer ring 44, and that surface is preferably ground smooth to establish a fluid-tight barrier with the seal 66 (FIG. 2). On the other hand, the forward surface 76 of the outer ring 44 has an annular groove 82 which opens out of it toward the front sealing surface 52 on the inner ring 42, and that groove contains an elastomeric seal 84 which projects inwardly and contacts the smooth sealing surface 52, forming a fluid-tight barrier with it. The two seals 66 and 84 in effect isolate a hydraulic chamber 86 within the clamp-up device D, that chamber being delineated by the opposing shoulders 54 and 80 on the inner and outer ring 42 and 44, respectively, and the concentric sealing surfaces 52 and 78, likewise on the inner and outer rings 42 and 44, respectively.

To permit pressurized fluid to be introduced into the chamber 86, the outer ring 44 is provided with a radial filler port 88 (FIGS. 2 and 5) that opens into the chamber 86 at the intersection of the rear sealing surface 78 and the rear wall 80 on the outer ring 44, and that port at its outer end may have a quick-connect hydraulic fitting threaded into it. Of course, when pressurized hydraulic fluid is introduced into the chamber 86 through the port 88, the outer ring 44 will move axially over the inner ring 42 and expand the width of the clamp-up device D. The force which develops is transmitted through the cone thrust ring 22 to the cone 32 of the bearing C, causing the cone 32 to move to its fully seated position around the bearing seat 6 and against the fillet ring 20. The purge chamber 86 of any air that may be trapped in it as it is filled with hydraulic fluid, the outer ring 44 is also provided with a vent port (not shown) that leads into the chamber 86 and is spaced about 120° from the filler port 88.

The rear wall 80 on the outer ring 44, like the front wall 54 of the inner ring 42 which it faces, is provided with camming or wedging ramps 92 (FIG. 4) that are equal in number and correspond in spacing to the ramps 62 of the front wall 54, but rise in the opposite direction. Even so, they are at the same inclination as the ramps 62. Also, the ramps 92 may be formed integral with the outer ring 44 or as separate elements. When the rings 42 and 44 are properly positioned with respect to each other, the inclined surfaces of the two ramps 62 and 92 will face and abut each other. Beyond this position, any further rotation of the outer ring 44 in the proper direction will cause the ramps 62 and 92 to move across each other and shift the outer ring 44 axially with respect to the inner ring 42. Thus, the clamp-up device D may be expanded by turning the outer ring 44 relative to the inner ring 42, as well as by pumping hydraulic fluid into the chamber 86.

The locking plate 46 (FIG. 3) possesses a T-shaped configuration in that it has an elongated base 94 and a retention tab 96 projected from the base 94 intermediate the ends of the base 94. The base 94 fits against the back shoulder 58 on the inner ring 42 and accordingly is narrow enough to fit between the end surface 60 on that ring and the surrounding surface 78 on the outer ring 44. The tab 96, on the other hand, is narrow enough to fit into any one of the notches 74 that open out of the rear of the outer ring 44. At each of its ends, the base 94 has bolt holes 98, and the spacing between these holes equals the spacing between any two adjacent threaded holes 68 that open out of the back shoulder 58 on the inner ring 42. The bolt holes 98 receive bolts 100 that thread into the holes 68 on the inner ring 42 and thereby secure the locking plate 46 to the inner ring 42 with its tab 96 projected into one of the notches 74 of the outer ring 44. This, of course, prevents the rings 42 and 44 from rotating relative to each other.

The outer ring 44 may be rotated relative to the inner ring 42 in several ways. First, a special spanner wrench (not shown) may be engaged with notches 74 on opposite sides of the outer ring 44 and a torque applied to the outer ring 44 by means of the wrench. In this instance, the inner ring 42 must be held fast with respect to the mill roll A and this may be achieved by fitting a key between the roll neck extension 10 and the inner ring 42. It may also be achieved by providing a radial groove in the rear end face 50 of the inner ring 42 and projecting a tang from the split hinged ring 24 into the groove. In this regard, the hinge ring 24, when its screw 30 is turned down tightly, firmly grips the roll neck extension 10 at the groove 14. As an alternative, a pry bar may be used to turn the outer ring 44, this being achieved by inserting its end through one of the notches 74 in the outer ring 44 and engaging it with a bolt threaded into one of the threaded holes 68 in the inner ring 42. This enables the outer ring 44 to be pryed around with respect to the inner ring 42, and the latter need not be fixed firmly to the roll neck extension 10.

INSTALLATION AND OPERATION

The clamp-up device D serves to assist in both mounting the bearing C on the roll neck 4 and holding the bearing C firmly in its operative position. To mount the bearing C, the bearing seat 6 of the roll neck 4 as well as the bore 38 of the cone 32 are cleaned to remove oil and grease from them. Then the bearing C, the cone thrust ring 22, and the surrounding chock B are all passed over the roll neck 4 and moved up onto the bearing seat 6 until they cannot be advanced any further. Next, the clamp-up device D, while in a contracted condition, is installed over the roll neck extension 10 with the front end faces 50 and 72 of the inner and outer rings 42 and 44, respectively, being presented toward the cone thrust ring 22. Indeed, the clamp-up device D is advanced far enough to bring the front end face 72 of the outer ring 44 into abutment with the cone thrust ring 22, and when the clamp-up device D is so disposed, the groove 14 in the roll neck extension 10 is completely exposed. Thereafter, the split hinged ring 24 is opened and installed in the groove 14 of the roll neck extension 10, it being secured in that groove by turning down its clamping screw 30. The split hinged ring 24 projects outwardly from the groove 14 and serves as a backing for the clamp-up device D. In this regard, the rear end face 50 of the inner ring 42 is located directly opposite to the split hinged ring 24 in a position to abut against the hinged ring 24.

Once the hinged ring 24 is secured in the groove 14, a hydraulic fluid line is coupled to the radial port 88 in the outer ring, and hydraulic fluid under pressure is forced into the chamber 86 between the two rings 42 and 44. This shifts the inner ring 42 relative to the outer ring 44, or vice-versa, causing the clamp-up device D to expand. Indeed, the inner ring 42 firmly abuts the split hinged ring 24, whereas the outer ring 44 moves against the cone thrust ring 22. Thereafter, the movement is all in the outer ring 44 which exerts sufficient force on the cone thrust ring 22 to drive the cone 32 of the bearing C up the tapered bearing seat 6. The movement continues until the cone 32 comes against the fillet ring 20, at which point the cone 32 of the bearing C is securely fitted upon the tapered bearing seat 6 and cannot be rotated relative to that seat. In other words, a tight fit exists between the cone 32 of the bearing C and the tapered bearing seat 6 (FIG. 1).

Once the cone 32 is fully seated, the hydraulic pressure is released and the hydraulic line disconnected from the port 88. The cone 32 of the bearing C, however, remains in position by reason of the friction between its bore 38 and the bearing seat 6. Thereafter, the outer ring 44 is turned relative to the inner ring 42 to bring the wedging ramps 62 and 92 of the two rings 42 and 44 into alignment and contact (FIG. 4). This retains the clamp-up device D in its expanded condition and thereby prevents the bearing cone 32 from moving down the tapered bearing seat 6.

Finally, the locking plate 46 is clamped against the back shoulder 58 of the inner ring 42 by means of the bolts 100, its tab 96 being projected outwardly into one of the notches 74 of the outer ring 44 (FIG. 3). This prevents the outer ring 44 from rotating relative to the inner ring 42 during the operation of the mill roll A.

To remove the bearing C from the roll neck A, the outer race 44 is turned in the reverse direction relative to the inner race 42 after, of course, removing the locking plate 46. In most instances, this can be achieved merely by use of a wrench or pry bar. However, if the friction between the two wedging ramps 62 and 92 is so great as to prevent the reverse rotation of the outer ring 44, then pressurized fluid may be again introduced into the chamber 86 by way of the radial port 88. The force generated by this pressure reduces the friction sufficiently to rotate the outer ring 44 backwardly enough to release the wedging ramps 62 and 92 from each other. Then, after releasing the pressure, the clamping device may be contracted slightly by inserting a small pry bar in one of the radial slots 51 or 73, and forcing the inner ring 42 away from the split hinged ring 24 or the outer ring 44 away from the cone thrust ring 22.

With the clamping device D in a contracted condition, the screw 30 in the split hinged ring 24 is removed so that the segments 26 of the split hinged ring 24 can be spread apart and released from the roll neck extension 10.

Finally, the bearing C is released in the usual manner, that is by directing hydraulic fluid through the bores 18 and into the shallow annular channels 16 of the bearing seat 6 so that the fluid when pressurized will expand the cone 32 enough to release its grip on the tapered bearing seat 6.

While the clamp-up device D has been illustrated and described in conjunction with a TQIT tapered roller bearing manufactured by The Timken Company, it may be used with other tapered roller bearings having more or less rows of tapered rollers. Some of these bearings do not require the fillet ring 20, in which case it may be eliminated. The clamp-up device D may also be used with cylindrical, spherical, and plain sleeve-type hydrodynamic oil film mill bearings.

Aside from the variety of mill bearings with which the clamping device D may be used, it may be employed with other types of backing arrangements, that is devices other than the split hinged ring 24. Also, means other than the locking plate 46 may be employed to prevent the rings 42 and 44 from rotating relative to each other. Moreover, the seals 66 and 84 may be housed in the opposite rings 42 and 44.

This invention is intended to cover all changes and modifications of the example of the invention herein chosen for purposes of the disclosure which do not constitute departures from the spirit and scope of the invention.

What is claimed is:

1. A clamp-up device for installing and holding a bearing on a shaft, such as the neck of a mill roll, said clamp-up device comprising: first and second rings adapted to fit around the shaft such that the first ring is prevented from moving off of the shaft while the second ring is free to move axially toward the bearing on the shaft, one of the rings being capable of rotating relative to the other of the rings, the first and second rings each having a generally radially directed wall surface and a generally axially directed wall surface, and the radially and axially directed wall surfaces of the two rings together defining an annular chamber which circumscribes the shaft and is otherwise arranged such that when it is pressurized with a fluid, the second ring will be urged axially toward the bearing so as to exert an axially directed force on the bearing and thereby move the bearing to its operating position on the shaft, each of the rings on its radially directed wall surface further having a ramp which will align with the ramp on the other of the rings when the rings are in the proper angular position relative to each other, the ramps further being configured to force the second ring away from the first ring upon relative rotation of the one ring relative to the other ring in the proper direction so as to hold the bearing in the operating position to which it is forced by the pressurized fluid; a first seal element located along the axially directed wall surface of the first ring to form a barrier between that wall surface and second ring; and a second seal element located along the axially directed wall surface of the second ring to form a barrier between that wall surface and the first ring.

2. A clamp-up device according to claim 1 wherein the first ring is further provided with an exposed shoulder that is directed generally radially, and the second ring projects axially beyond shoulder where it is provided with notches, and further comprising a locking plate configured to fit against the shoulder and having an element projected into one of the notches on the second ring, and means for securing the locking element to the shoulder of the first ring, whereby the rings will remain in the proper angular relation to each other.

3. In combination with a mill roll having a roll neck provided with a tapered portion, a bearing around the tapered portion of the roll neck, and a detachable backing member located on the roll neck beyond the small end of the tapered portion and the bearing on the tapered portion such that a space exists between the backing member and the bearing; an improved clamp-up device located in the space between the backing member and the bearing for both moving the bearing axially over the roll neck to the proper position on the tapered portion thereof and for holding the bearing in that position during operation of the mill roll, said clamp-up device comprising: a first ring surrounding the roll neck and being backed by the backing member, so that it cannot move axially off of the roll neck when the backing member is in place on the roll neck; a second ring surrounding the roll neck and being displaceable axially with respect to the first ring, one of the rings further being rotatable relative to the other ring; means on at least one of rings for receiving a fluid under pressure and for extending the second ring toward the bearing under the force exerted by that pressure so as to move the bearing to its operating position; and a ramp on at least one of the rings and being positioned opposite a surface on the other of the rings to hold the second ring in the extended position to which it is moved under the fluid pressure.

4. In combination with a mill roll having a roll neck, a bearing around the roll neck, and a detachable backing member located on the roll neck beyond the bearing so that a space exists between the backing member and the bearing; an improved clamp-up device located in the space between the backing member and the bearing for both moving the bearing axially over the roll neck to the proper position thereon and for holding the bearing in that position during operation of the mill roll, said clamp-up device comprising: a first ring surrounding the roll neck and being backed by the backing member so that it cannot move axially off of the roll neck when the backing member is in place on the roll neck; a second ring surrounding the roll neck and being displaceable axially with respect to the first ring, one of the rings being rotatable relative to the other ring, one of the rings further having an exposed surface and the other of the rings having a portion that is concentric to the exposed surface and provided with notches; means on at least one of the rings for receiving a fluid under pressure and for extending the second ring toward the bearing under the force exerted by that pressure so as to move the bearing to its operating position; a ramp on at least one of the rings and being positioned opposite a surface on the other of the rings to hold the second ring in the extended position to which it is moved under the fluid pressure; a locking element configured to fit against the exposed surface on the one ring and having a tab that projects into one of the notches of the other ring; and means for securing the locking element firmly to the exposed surface, whereby the rings are prevented from rotating relative to each other.

5. A clamp-up device for installing and holding a bearing on a shaft, such as the neck of a mill roll, said clamp-up device comprising: first and second rings, each of which are continuous in the circumferential direction and is large enough to fit over the shaft, the second ring being fitted to the first ring such that it generally extends around the first ring and such that the two rings when so fitted can rotate relative to each other, the two rings further being configured to enclose an annular fluid chamber that likewise encircles the shaft, with the chamber being arranged such that when it is pressurized with a fluid, one ring will be urged axially with respect to the other ring so as to increase the thickness of the clamp-up device; first and second cam ramps carried by the first and second rings, respectively, and being exposed to the fluid chamber, the ramps further being located to align with and contact each other when the rings are in the proper angular positions relative to each other, so that upon rotation of one ring relative to the other ring in the proper direction, the first and second ramps, acting upon each other, will cause the rings to be urged apart, whereby the rings are held in the position which they are caused to assume by the pressurized fluid; and means for locking the rings together so that they cannot rotate relative to each other.

6. A clamp-up device according to claim 5 wherein the first ramp is one of several first ramps spaced at equal circumferential intervals around the first ring and the second ramp is one of several second ramps spaced at equal circumferential intervals around the second ring.

7. A clamp-up device according to claim 5 and further comprising axially spaced seals located between the first and second rings to isolate the fluid chamber from the surrounding atmosphere.

8. A clamp-up device according to claim 5 wherein the sealed chamber is defined by a generally radially directed wall on the first ring and a generally radially directed wall on the second ring, and the ramps of the two rings are on the generally radially directed walls.

9. A clamp-up device according to claim 8 wherein the sealed chamber is further defined by an axially extending wall on the first ring and an opposing axially extending wall on the second ring; and further comprising a first seal element located along axially extending wall of the first ring to form a barrier between that wall and second ring, and a second seal element located along the axially extending wall of the second ring to form a barrier between that wall and the first ring.

10. In combination with a mill roll having a roll neck, a bearing around the roll neck, and a detachable backing member on the roll neck beyond the bearing so that a space exists between the backing member and the bearing; an improved clamp-up device located in the space between the backing member and the bearing for both moving the bearing axially over the roll neck to the proper position thereon and for holding the bearing in that position during operation of the mill roll, said clamp-up device comprising: a first ring surrounding the roll neck and being backed by the backing member so that it cannot move axially off of the roll neck when the backing member is in place on the roll neck and a second ring surrounding the roll neck and being displaceable axially and rotatably with respect to the first ring, the rings being continuous in the circumferential direction and being configured such that one fits generally around the other, the rings when so fitted enclosing a fluid chamber, with the chamber being arranged such that when it is pressurized with a fluid the rings will shift axially with respect to each other so as to increase the thickness of the clamp-up device, whereby the bearing will be moved to its proper position on the neck; a first ramp carried on the first ring in a fixed position thereon and a second ramp carried by the second ring in a fixed position thereon, both ramps being exposed to the fluid chamber, the first and second ramps further being located to align and contact each other when the rings are in the proper angular position relative to each other, so that upon rotation of the second ring relative to the first ring, the first and second ramps, acting upon each other, will cause the rings to be urged apart, whereby the bearing will be held in the position to which it is moved by the pressurized fluid; and means for locking the two rings together so that they cannot rotate relative to each other.

11. The structure according to claim 10 and further comprising axially spaced seals located between the first and second rings to isolate the fluid chamber from the surrounding atmosphere.

12. The structure according to claim 10 wherein the portion of the roll neck over which the bearing fits is tapered down toward the portion around which the clamp-up device fits.

* * * * *